July 22, 1958 S. ENGELSTEIN 2,843,955

RECORD CARD AND FILM HOLDER ASSEMBLY

Filed April 5, 1957 2 Sheets-Sheet 1

INVENTOR.
STANLEY ENGELSTEIN

BY Kenyon & Kenyon
ATTORNEYS

July 22, 1958 S. ENGELSTEIN 2,843,955

RECORD CARD AND FILM HOLDER ASSEMBLY

Filed April 5, 1957 2 Sheets-Sheet 2

INVENTOR.
STANLEY ENGELSTEIN

BY Kenyon & Kenyon

ATTORNEYS

United States Patent Office 2,843,955

Patented July 22, 1958

2,843,955

RECORD CARD AND FILM HOLDER ASSEMBLY

Stanley Engelstein, Roslyn Heights, N. Y., assignor to Enbee Transparent Specialty Company, Inc., New York, N. Y., a corporation of New York Application April 5, 1957, Serial No. 650,969

6 Claims. (Cl. 40—158)

The present invention relates generally to a record card and film holder assembly for use in indexing and classifying microfilm slides and the like, and more particularly to a film holder which is insertable in the display window of a record card to afford a mounting for a film.

Card record systems are known wherein microfilms mounted on cards are stored in a filing system adapted to index, classify and sort the film, whereby a desired film may be selected for optical projection or for photographic reproduction. For example, engineering drawings may be reduced to microfilm and stored in such card systems, the drawings being selectively available for inspection. The films may be mounted in cards perforated for use in conjunction with sorting and classifying punch card machines of the standard types. Such machines function to arrange the cards in accordance with the location of the perforations, so that the cards may later be processed to select those which contain film having the desired subject matter. In other instances, the films may be mounted on cards forming part of an alphabetically arranged index or any other coded form of filing system.

One well known type of record card for mounting film, such as that disclosed in the patents to Langan 2,511,859 and 2,512,106, takes the form of a card having a window covered by a transparent sheet of adhesive material to which a film may be attached. To protect the adhesive sheet from exposure so that the cards do not stick to each other, the adhesive sheet is covered temporarily by a cover sheet. Therefore in order to apply the film, the cover sheet must be stripped off and the film substituted therefor.

Cards of this type are relatively expensive to manufacture and inconvenient to handle. For example, to remove the cover sheet, it is necessary to hold the card with the adhesive sheet uppermost, and a pencil point or similar pointed instrument is inserted in the opening to tear the cover. The torn edges of the cover are then grasped by the fingers and the sheet stripped off the adhesive.

Moreover, the optical properties of the adhesive serving to bond the film to the transparent sheet are such as to interfere somewhat with the clarity of the projection particularly when chemical changes occur as a result of ageing. Another disadvantage of such prior art structures is that since the film is adhesively secured to the card, its later removal for insertion in another card or for some other purpose is made difficult.

In view of the foregoing, it is the principal object of the present invention to provide a record card and film holder assembly, whereby a film may be readily inserted in the holder and the holder securely installed in an open window without the use of adhesives, temporary cover sheets or other costly and inconvenient expedients. A feature of the invention resides in the fact that the holder may readily be removed from the card and that the film may be withdrawn from the holder.

More particularly it is an object of the invention to provide a transparent film holder having a film jacket and gripping means adapted to secure the jacket in place on a record card window.

Also an object of the invention is to provide a film holder having a pair of lips on opposing ends thereof adapted to releasably grip the edges of a card window.

Yet another object of the invention is to provide a card having a window formed with indented shoulders adapted to receive the lips of a jacket whereby said lips lie flush with the surface of the card. A significant advantage of this arrangement is that no surface projections exist which would cause one card to catch on another.

Also an object of the invention is to provide a film holder and card assembly which may be manufactured at low cost.

Briefly stated, in a card and film holder assembly in accordance with the invention, the card is provided with an open window into which is inserted a transparent film holder constituted by superposed panels joined together by a pair of ribs in parallel relation, the spacing between the ribs being sufficient to form a jacket for accommodating a microfilm plate or slide. The dimensions of the jacket conform substantially to those of the window. Extending outwardly from the jacket are gripping means for securing the holder to the record card. In a preferred embodiment the gripping means are constituted by cooperating lips formed by integral extensions of the jacket panels.

For a better understanding of the invention as well as other objects and further features thereof, reference is had to the following detailed description to be read in conjunction with the accompanying drawing, wherein like components in the various views are identified by like reference numerals.

Figure 9:
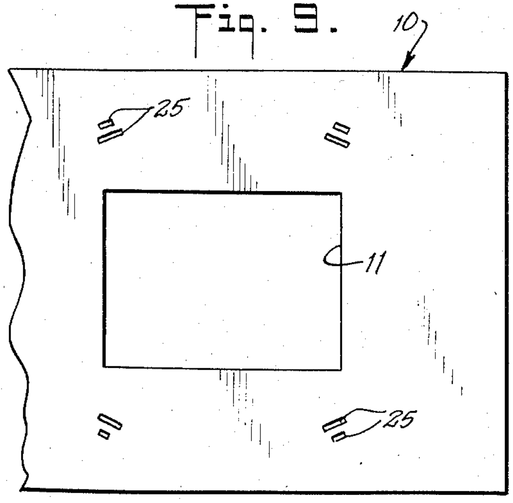

Fig. 9 in plan view is yet another form of card in accordance with the invention.

Figures 8, 10:
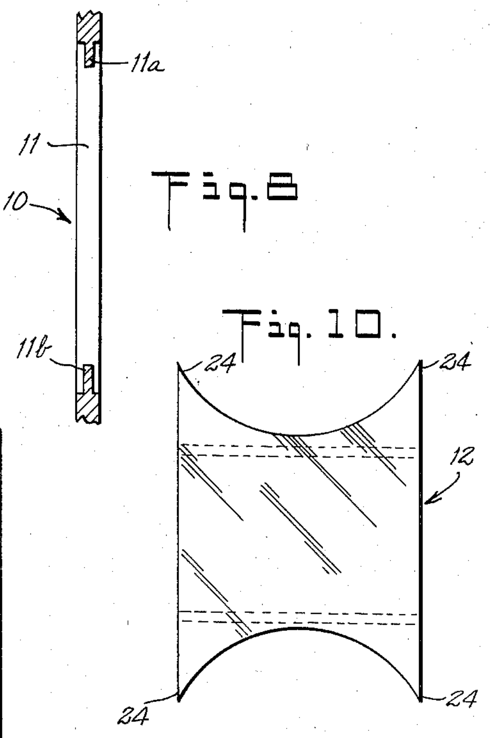
Fig. 8 is a section taken along the plane of lines 8—8 in Fig. 7.

Fig. 10 is a plan view of a film holder for use with a card of the type shown in Fig. 9.

Figure 1:
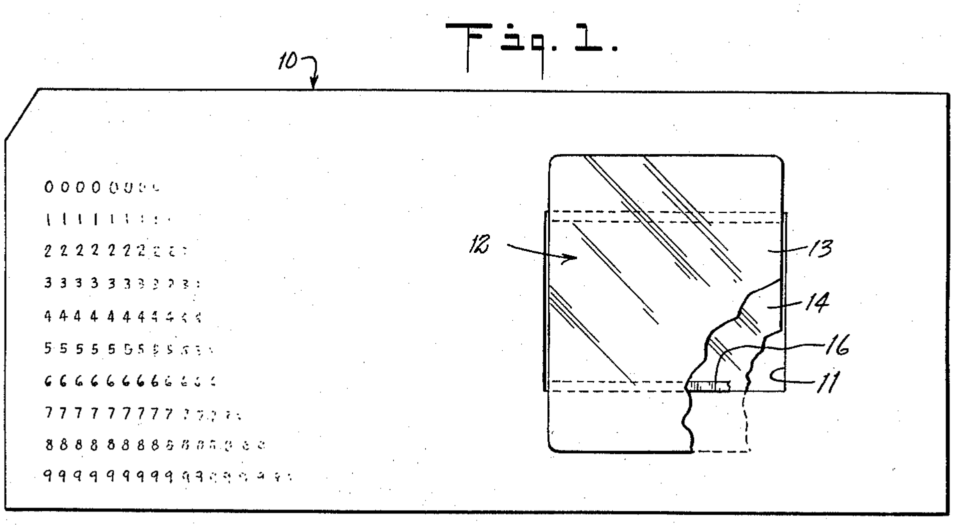
Fig. 1 illustrates in plan view one preferred embodiment of a card and film holder assembly in accordance with the invention.

Referring now to the drawings and more particularly to Fig. 1, the card 10 illustrated therein represents a standard card designed for use in conventional punched card classifying and sorting machines. The card is provided with horizontal rows of numbers or other indicia and may be perforated in accordance with a code to symbolize the characteristic or nature of the film mounted thereon. The card is provided with a rectangular aperture or open window 11 adapted to receive a transparent film holder, generally designated by numeral 12.

It is to be understood that the invention encompasses cards of any suitable type for record purposes and the punched card shown herein is by way of illustration only. The card may be of single ply or multi-ply material in any desired gauge and it may be rectangular or square.

The window may also be rectangular or square depending on the nature of the film holder inserted therein.

Figures 2, 4:
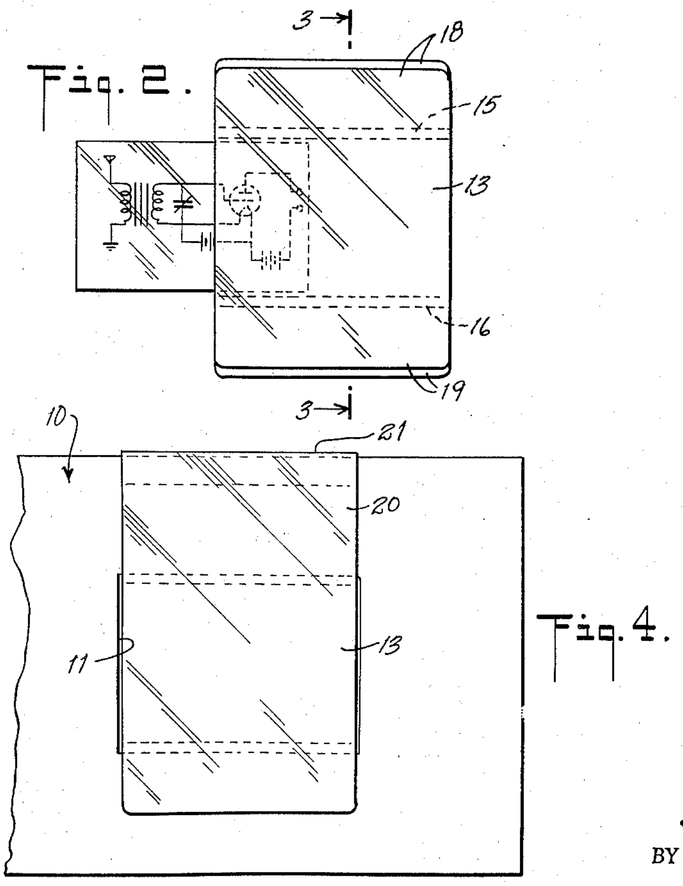
Fig. 2 is a plan view of the film holder shown in Fig. 1.
Fig. 4 is a plan view of another preferred embodiment of a card and film holder assembly in accordance with the invention.
Figure 3:
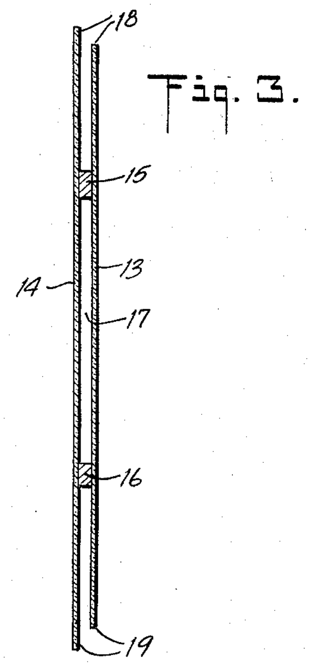
Fig. 3 is a section of the holder taken along the plane of lines 3—3 in Fig. 2.

The film holder, as best seen in Figs. 2 and 3, is constituted by two superposed panels 13 and 14 of transparent flexible plastic material, such as cellulose acetate or Mylar, having a thickness, for example, in the order of .003 to .007 of an inch. The panels are held in spaced parallel relation by two ribs 15 and 16 formed of plastic strip material, preferably colored.

The ribs 15 and 16 are positioned in parallel relation to define a jacket 17 into which is slidable a microfilm to be displayed. The ribs 15 and 16 are so spaced as to lie adjacent the upper and lower edges of the window 11 when the holder is mounted therein. In practice, the ribs are of any suitable gauge from .0075 to .020 of an inch, and in any particular application the rib may be the same or of less thickness than that of the card. The width may be 1/16 or 3/32 of an inch and color is optional. The dimensions of the jacket will of course depend on the size of the film to be inserted, whether 16 or 35 mm. More than one film frame may be inserted if desired.

The ribs 15 and 16 are spaced inwardly relative to the upper and lower ends of the panels to define two pairs of normally closed lips 18 and 19. The length of the lower panel 14 is made somewhat greater than that of the upper panel 13 to provide an overlap facilitating manipulation of the lips. To install the holder in the window, the user merely opens the lips by flexing the larger lower lips away from their cooperating upper lips, and then inserting the related edges of the window into the lips. When the lips are thereafter released, they clamp on the window edges and thereby mount the film holder securely in place.

In manufacturing the film holder, a continuous web of the plastic material may be fed into pressure rollers in superposed relation concurrently with two continuous bands of the strip material. The strip material is first fed through a bath of adhesive solution so that the surfaces thereof are coated, and when the strips and webs are pressed together in the pressure rollers, a firm bond is formed. Thereafter the combined webs and strips are cut to the desired dimension.

Figure 5:
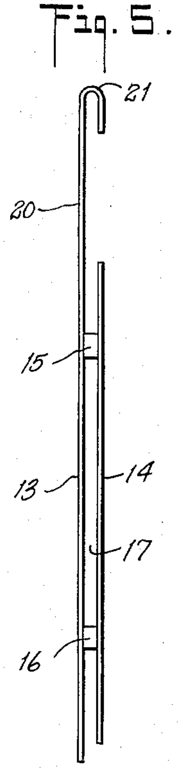
Fig. 5 is a side view of the film holder shown in Fig. 4.
Figure 6:
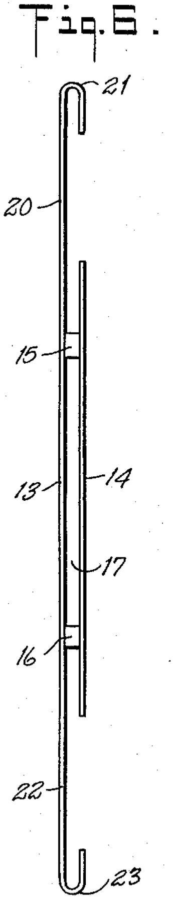
Fig. 6 is a side view of a modified form of film holder.

As shown in Figs. 4 and 5, the film holder may also be provided with a flap 20 extending from the upper end of the top panel 13 and folded over at the top to form a hook 21. When the holder is mounted on the card, hook 21 engages the upper edge of the card and acts to prevent any angular movement thereof. As a further security, the holder may be provided with a bottom flap 22, as shown in Fig. 6, having a hook 23 formed therein. Since the panels are of thermoplastic material, the hooks may be impressed in the flaps by combined heat and pressure in the usual manner.

Figure 7:
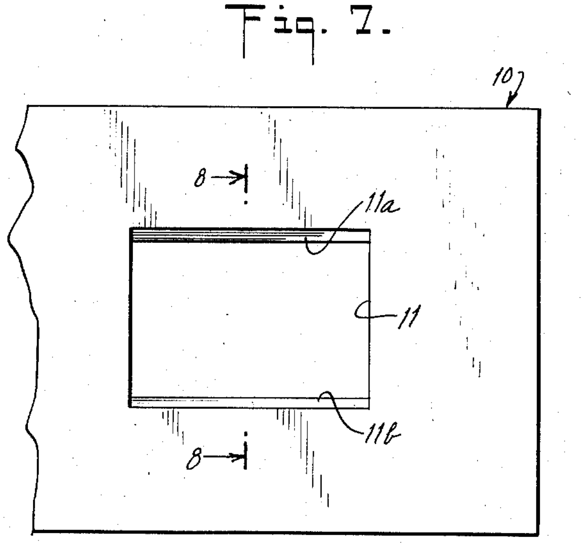
Fig. 7 is a modified form of a window for a card in accordance with the invention.

It is desirable that the surfaces of the film holder lie substantially flush with that of the record card. This can be accomplished by indenting or recessing the upper and lower edges of the window 11 to form shoulders **11*a* and 11*b***, as shown in Figs. 7 and 8. These shoulders can be formed by compression of the card material in a suitable die press. The dimensions of the shoulders are made such as to accommodate the lips of the film holder, whereby the lips will seat therein flush with the card surface.

In place of lips for mounting the film holder, the corners of the film holder may, as shown in Fig. 10, be provided with tongues 24. The tongues are insertable in suitable slits 25 cut into the card adjacent the corners of the window 11, as shown in Fig. 9.

Thus there has been described and illustrated a card and film holder assembly in which the film holder is adapted to receive and display a microfilm wherein the film holder may be releasably mounted on a card without the use of adhesives or special tools.

In lieu of ribs to form the jacket in the holder, the two panels may be bonded together along parallel lines to define a jacket and lips. This bonding may be effected by conventional electronic sealing means, by cementing or any other known technique.

It is to be understood that many changes and modifications may be made in the assembly without departing from the essential aspect of the invention and it is intended in the accompanying claims to cover all such changes and modifications as fall within the true spirit of the invention.

What is claimed is:

1. A record card and film holder assembly comprising a card having an open window therein, and a film holder mountable in said window including a transparent jacket for displaying a film and releasable means extending from said jacket and integral therewith for securing said jacket to the edges of said window.

2. A record card and film holder assembly comprising a punch card having an open rectangular window therein, and a film holder mountable in said window and constituted by two transparent plastic panels of flexible material joined together by two parallel ribs to define a jacket for receiving film and two pairs of lips at either end of the jacket adapted to clamp on the edges of said window.

3. An assembly as set forth in claim 2, wherein one panel of said holder is oversize relative to the other whereby the lips formed thereby may be readily manipulated.

4. A record card and film holder assembly comprising a card having an open window therein, and a film holder mountable in said window and including a pair of superposed transparent panels of flexible material joined together by parallel ribs to define a jacket for receiving a film and two pairs of lips at either end of the jacket adapted to clamp on the edges of said window, the clamped edges of said window having shoulders formed therein whereby said lips lie flush with the surface of said card.

5. A record card and film holder assembly comprising a card having an open window therein, and a film holder mountable in said window and including a pair of superposed transparent panels of flexible material joined together by parallel ribs to define a jacket for receiving a film and two pairs of lips at either end of the jacket adapted to clamp on the edges of said window, one of said panels further including a flap extension having a hook formed therein to engage the upper end of said card.

6. A record card and film holder assembly comprising a card having an open window therein, and a film holder mountable in said window and including a pair of superposed transparent panels of flexible material joined together by parallel ribs to define a jacket for receiving a film and two pairs of lips at either end of the jacket adapted to clamp on the edges of said window, one of said panels further including flap extensions on either end having hooks formed therein to engage the upper and lower ends of said card.

References Cited in the file of this patent

UNITED STATES PATENTS

| | | |
|---|---|---|
| 1,446,082 | Applegate | Feb. 20, 1923 |
| 2,256,399 | MacHarg | Sept. 16, 1941 |
| 2,633,655 | Langan | Apr. 7, 1953 |